United States Patent
Block et al.

(12) United States Patent     (10) Patent No.: US 7,031,563 B2
Block et al.     (45) Date of Patent: Apr. 18, 2006

(54) OPTICAL CLOCKING WITH A RING RESONATOR

(75) Inventors: Bruce A. Block, Portland, OR (US); Brandon C. Barnett, Beaverton, OR (US); Paul Davids, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 10/431,645

(22) Filed: May 6, 2003

(65) Prior Publication Data

US 2004/0223683 A1     Nov. 11, 2004

(51) Int. Cl.
*G02B 6/26*     (2006.01)

(52) U.S. Cl. .............................. 385/15; 385/27; 385/42; 385/48

(58) Field of Classification Search .................. 385/15, 385/27, 31, 32, 48, 129–132, 39
See application file for complete search history.

(56) References Cited

U.S. PATENT DOCUMENTS

| 2004/0120367 A1* | 6/2004 | Siepmann | 372/25 |
| 2004/0146431 A1* | 7/2004 | Scherer et al. | 422/82.05 |

* cited by examiner

*Primary Examiner*—Sarah Song
(74) *Attorney, Agent, or Firm*—Fish & Richardson P.C.

(57) ABSTRACT

A microchip may include an optical clocking system. The optical clocking system may include a ring resonator which multiplies the frequency of light pulses from a light source for use as optical clocking signals and distribution waveguides to distribute the optical clocking signals to different regions of the microchip.

23 Claims, 7 Drawing Sheets

US 7,031,563 B2

OPTICAL CLOCKING WITH A RING RESONATOR

BACKGROUND

Clock signals in an integrated circuit (IC) may be generated by a clock circuit including a crystal oscillator and one or more phase-locked loops (PLLs). An external piezoelectric quartz crystal, tuned for a specific parallel-resonant frequency, may be electrically resonated by the on-chip crystal oscillator. The crystal frequency, called the reference frequency ($f_{REF}$), may be fed to a PLL which produces the desired output frequency.

The PLL multiplies the reference frequency to the desired output frequency. The PLL locks the output frequency to the reference frequency. If the reference frequency moves, the output frequency will track the move.

DETAILED DESCRIPTION

Figure 1:
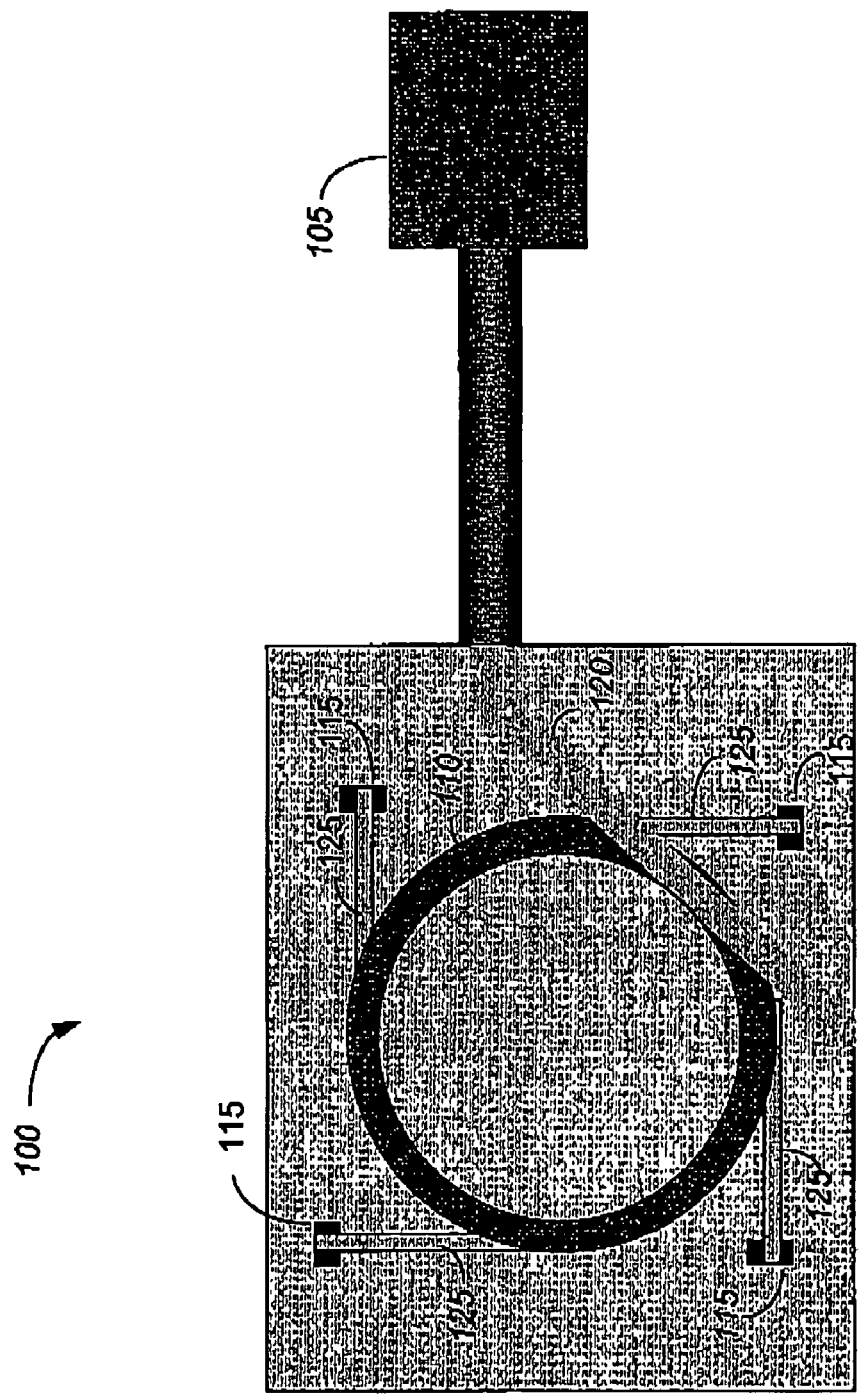
FIG. 1 is a block diagram of an optical clocking system including a ring resonator.

FIG. 1 shows an optical clock signal generation system 100. A light source 105 may provide a pulsed light beam to a ring resonator 110. The pulsed light beam may have a frequency which is multiplied by the ring resonator 110 to a microprocessor clock frequency.

The ring resonator 110 may have an optical path length that is either $A*(1-1/x)$ or $A*(1+1/x)$, where A is the optical path length a pulse travels before the next pulse is launched, and x is the multiplication factor of the incoming clocking source. Light pulses travel around the ring and are refreshed every x passes. At a steady state, the pulses spacing may be 1/x the original spacing and the clocking source frequency may be multiplied by a factor of x.

The high frequency pulse stream circulating in the resonator may be used as a clock source. Light pulses may be extracted from the ring resonator and detected by photodetectors that convert the optical pulses into the electrical clocking signal. The pulses may be distributed by optical waveguides throughout the chip to the photodetectors 115.

Modulated taps may be provided around the ring to tap off a portion of the pulse and distribute the energy to photodetectors and clocking circuitry. By matching the path length to each detector by adjusting the tap point on the resonator and the coupler waveguide length, light pulses may be distributed to detectors across the microprocessor at the same time to generate a clock for the microprocessor.

The light source 105 may be a mode-locked laser. "Mode" refers to the solution of Maxwell's wave equation satisfying the boundary conditions of a waveguide, thus forming a unique pattern of standing wave in the radial direction on the cross section of the waveguide. A mode is characterized by its propagation constant (eigenvalue of the wave equation).

The mode-locked laser may be a vertical cavity surface emitting laser (VSCEL), mode-locked laser diode, or fiber-coupled laser source. VCSELs may be desirable for their uniform, single mode beam profiles, which may be more easily coupled to optical fibers. Currently available VCSELs may provide a frequency of up to about 10 GHz. A mode-locked laser diode may produce a laser in which many resonant modes are coupled in phase, to yield a train of very short pulses (e.g., picosecond pulses). The coupling of the modes is obtained by modulation of the gain in the resonator, and may be active (electro-optic modulation of the losses or of the pump intensity) or passive (e.g., with a saturable absorber).

Light pulses from the off-chip light source 105 may be transferred to the ring resonator 110 by an on-chip delivery waveguide 120. The delivery waveguide 120 may be mode matched to the light source 105. The mode matching may provide efficient coupling between the source and the waveguide.

Figure 2:
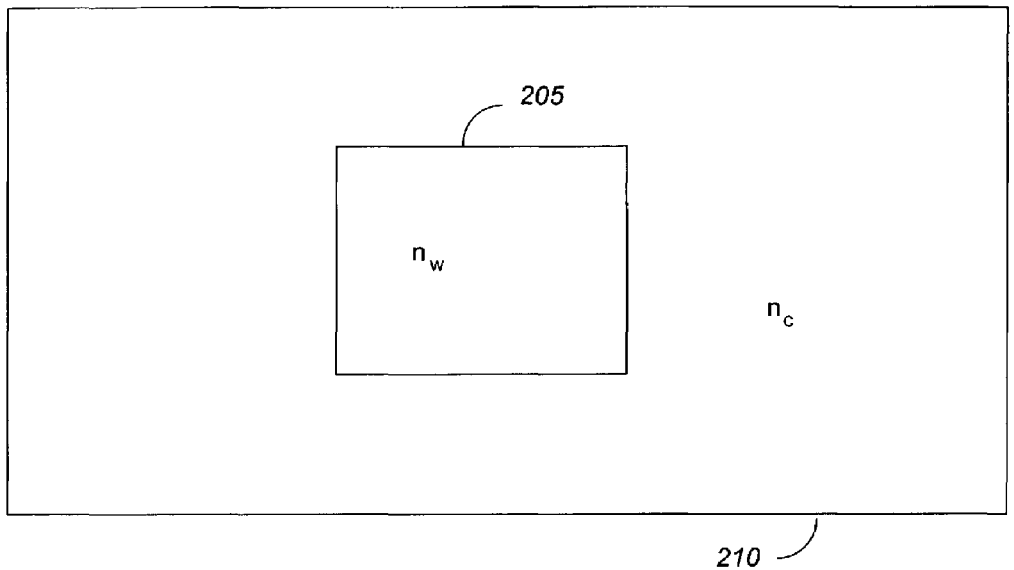
FIG. 2 is a sectional view of an integrated silicon waveguide.
Figure 3:
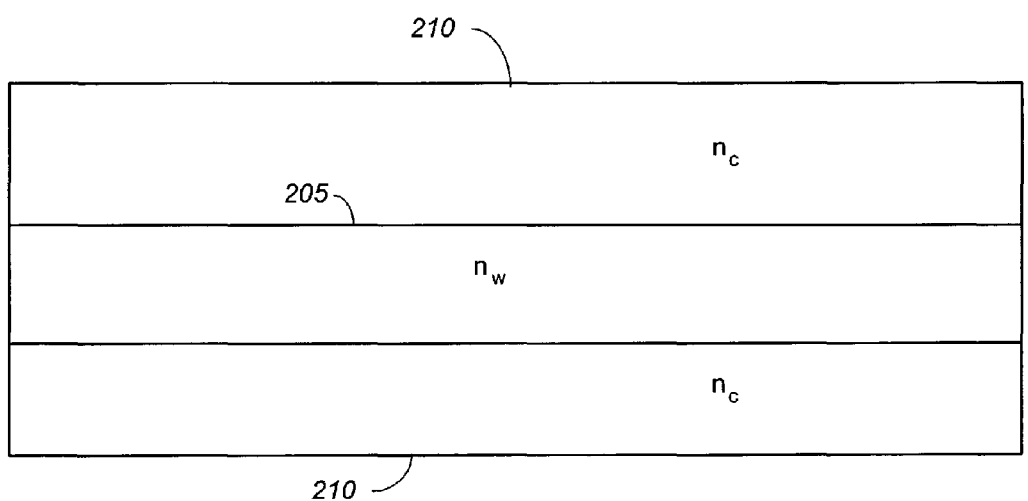
FIG. 3 is a plan view of the integrated silicon waveguide.

The delivery waveguide 120 may be integrated in the chip. A cross section and a top view of an integrated waveguide are shown in FIGS. 2 and 3, respectively. The waveguide may include an optically guiding core 205 of a material with refractive index $n_w$ surrounded by a cladding material with a different index of refraction, $n_c$. The high contrast of the refractive index between the two materials provides nearly complete internal reflection in the core, thereby confining a lightwave to the waveguide 205.

Silicon oxide ($SiO_2$) ($n_c \approx 1.5$) may be used as the cladding material. The waveguide material may be selected from, e.g., silicon nitride ($Si_3N_4$) ($n_w \approx 2$), silicon (Si) ($n_w \approx 3$), and silicon oxynitride (SiON) ($n_w \approx 1.55$). Silicon oxynitride may offer design flexibility because its refractive index can be varied by changing the content of nitrogen.

Waveguides may be classified as high index contrast (HIC) or low index contrast (LIC) depending on the difference in the indices of refraction between the core and the cladding. For example, for an $n_c \approx 1.5$, an HIC waveguide may have $n_w \approx 2.0$ and an LIC waveguide may have $n_w \approx 1.5$. In an HIC waveguide, core and cladding materials are chosen to have very different indices of refraction. This, in turn, may cause the electric field to be strongly confined within the core, substantially reducing radiation loss for sharp bends (e.g., less than about 50 microns) and allowing smaller structures to be produced.

The delivery waveguide 120 may be an integrated LIC silicon waveguide. The ring resonator 110 may also be a silicon waveguide integrated into the chip. The ring resonator may be asymmetrically coupled to the delivery waveguide 120 such that light is coupled into the waveguide ring but not back into the delivery waveguide. A directional coupler may be used for this purpose.

Figure 4:
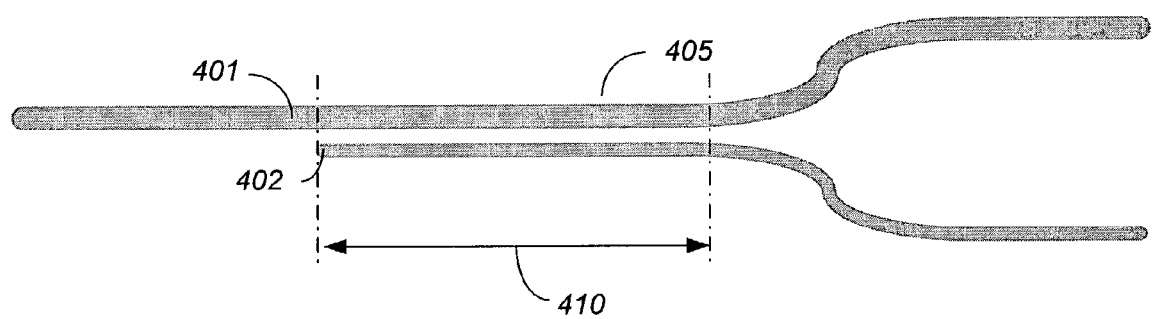
FIG. 4 is a plan view of a directional coupler structure.

Directional couplers and modulated taps may have similar structures, such as that shown in FIG. 4. The structure includes two side-by-side waveguides 401 and 402 separated by a few micrometers and an electrode 405 to provide a switching voltage.

Evanescent coupling may occur when the evanescent tails of each waveguide overlap to such a degree that there are two possible solutions for mode propagation in the two-waveguide structure. These may be referred to as the "Supermodes" or "Eigenmodes." The two solutions may have symmetric and antisymmetric energy distributions and differing propagation constant values. As the relative phases of the modes change, the energy is shared between the two waveguides and at matching and mismatched phase, the energy is alternately maximized in each waveguide, i.e., the energy beats back and forth between the waveguides, dependent on the waveguide separation and the interaction length.

Voltage applied by the electrode 405 may cause a change in the evanescent coupling efficiency between the two waveguides. In the off state the light goes through the device unaltered, i.e., no light is tapped from the waveguide 401. When a high frequency signal voltage is applied, the intensities at the output ports 410 are determined by either modulation of the phase mismatch, $\Delta\beta$, or the coupling coefficient K. Thus, change of voltage by an amount $V_s$ switches an input signal from one output port to the other. For a directional coupler, all of the light may be switched from one waveguide to another (e.g., from the delivery waveguide 120 to the ring resonator 110). For a modulated tap, only a portion of the light may be needed. Since all of the light is not being switched to the other waveguide (e.g., from the ring resonator 110 to a distribution waveguide 125) a full $\pi$ phase shift may not be required, and a smaller switching voltage $V_s$ may be used.

Figure 5:
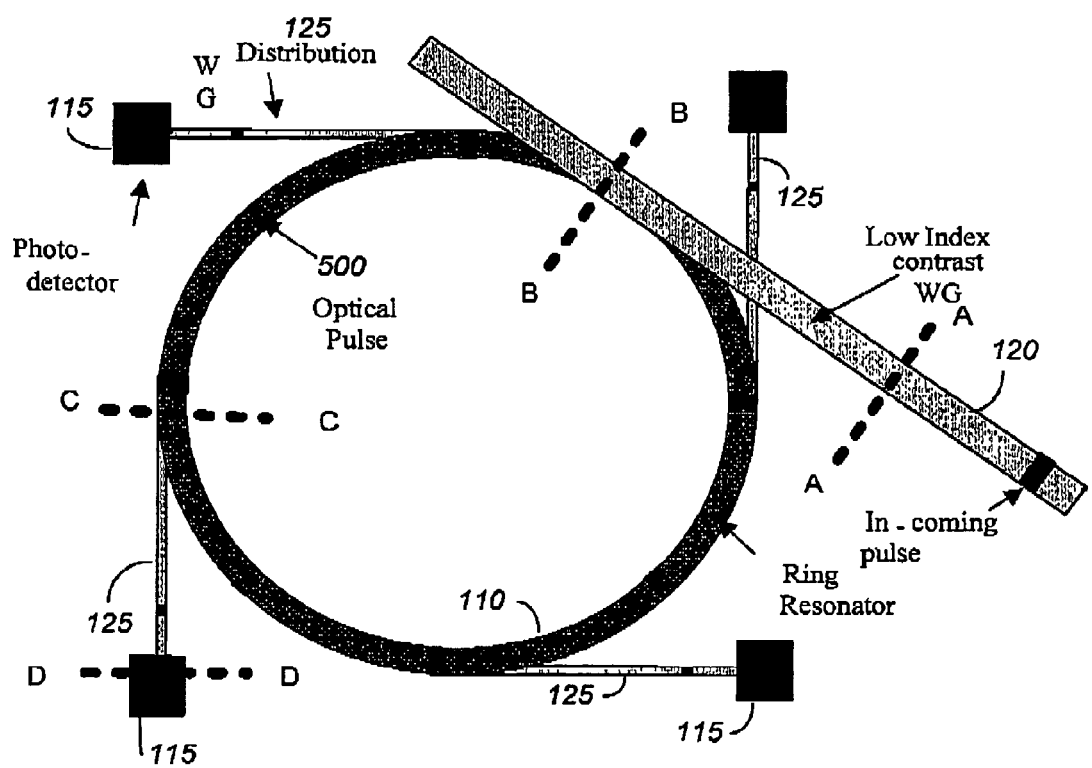
FIG. 5 is a block diagram of the optical clocking system in operation.

As shown in FIG. 5, light pulses 500 from the ring resonator 110 may be transferred to photodetectors by distribution waveguides 125, which may be relatively small, HIC waveguides. The light pulses may be extracted from the ring resonator by modulated taps.

Figure 6A:
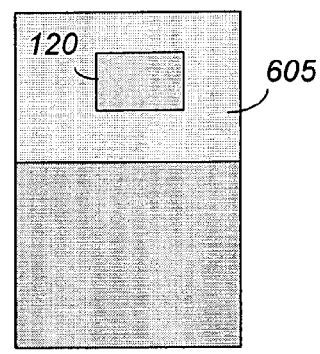
FIGS. 6A to 6D are sectional views of the optical clocking system.
Figure 6B:
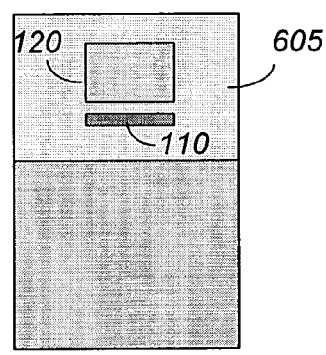
Figure 6C:
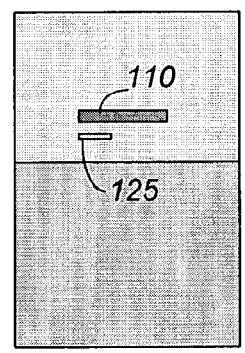
Figure 6D:
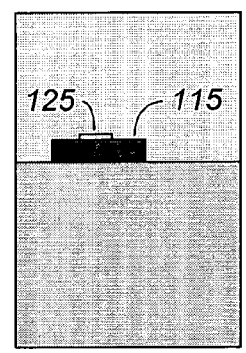

FIGS. 6A to 6D show cross-sections of the low index contrast waveguide (along section A—A in FIG. 5), the convergence point of the resonance ring waveguide (B—B), the convergence point of the resonance ring waveguide and a distribution waveguide (C—C), and a photodector on a silicon layer of the chip (D—D), respectively. As shown in FIG. 6A, the delivery waveguide 120 may have a relatively large core, which is surrounded by a cladding layer 605. The ring resonator 110 may have a smaller core than the delivery waveguide, and may have a higher index contrast with the cladding layer. The ring resonator and delivery waveguide may be spaced apart a distance which provides efficient coupling of light pulses from the delivery waveguide to the ring resonator, as shown in FIG. 6B. Similarly, the distribution waveguide 125 may have a smaller core than the ring resonator, and may have a higher index contrast with the cladding layer. The ring resonator and the distribution waveguide may be spaced apart a distance which provides efficient coupling of light pulses from the ring resonator to the distribution waveguide, as shown in FIG. 6C. The distribution waveguide may transfer light directly to the photodetector 115, as shown in FIG. 6D.

As described above, the light source modulates at a frequency 1/x less then the desired microprocessor clock frequency, where x is the clock multiplication factor provided by the ring resonator. In an embodiment, the light source may provide a 6 GHz pulse stream and x=10, although other numbers are possible. A typical microprocessor may have an area of about 1 cm×1 cm. The ring resonator may have a diameter of about 1 cm and a circumference of about 3 cm. The pulse stream makes one trip around the loop at the same time the next pulse arrives. For a multiplication of x=10, a 6.6 GHz pulse may be used to multiply the frequency to 60 GHz. Alternatively, a 5.4 GHz pulse stream may be used to multiply the frequency to 60 GHz. As the first pulse makes one full loop and completes 10% (1/x) of the next loop, another pulse may enter the ring resonator. These two pulses are now separated by 1/10 the loop ring distance. These two pulses complete the loop plus 10% and another pulse enters, so there are now three pulses in the loop. This process continues until there are ten pulses within the loop all separated by the same distance, i.e., 1/10 the circumference, which is about 0.3 cm. On the next pass, the next pulse is combined with the first pulse and the process continues, building up energy in the ten pulses. If the ring were lossless then power in the ring would constantly increase. However, with loss in the ring, a steady state may be reached rapidly. The frequency of the pulse has now been multiplied by ten and has a frequency of 60 GHz.

Figure 7:
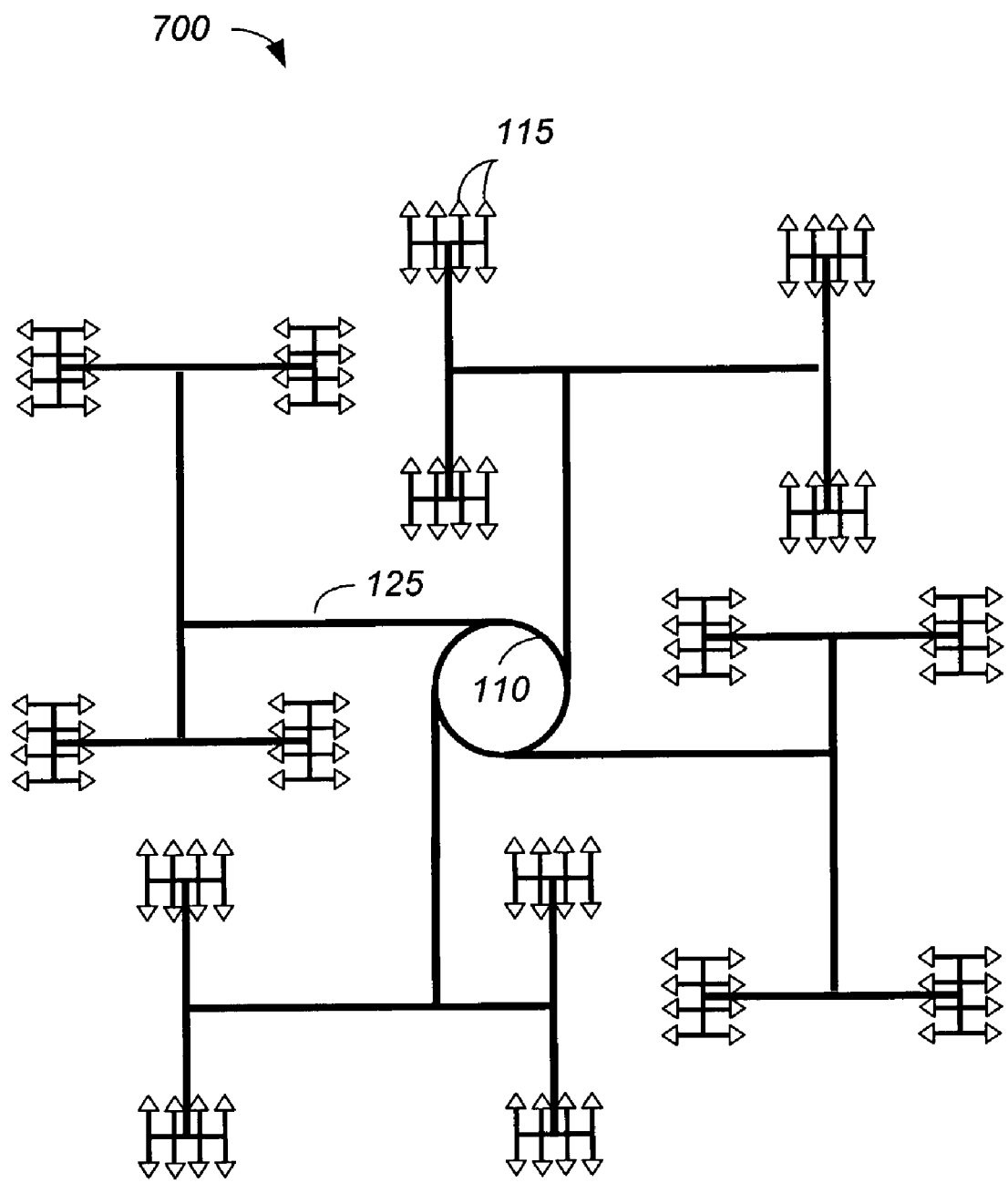
FIG. 7 is a schematic diagram of an H-Tree optical clocking signal distribution system.

In an embodiment, the distribution waveguides waveguide may be laid out in a pattern, e.g., a tree structure 700, to distribute the light across the chip, as shown in FIG. 7. With HIC distribution waveguides, the bend radii at the corners of the tree may be relatively small (e.g., less than about 50 microns). Photodetectors 705 may convert the light signals into electrical signals. The electrical signals may be transferred to electronic circuitry in the chip through electrical interconnects in metallization layers of the chip.

The waveguides, directional couplers, taps, and photodetectors may be created on the chip using standard complementary metal oxide semiconductor (CMOS) fabrication methods. For example, the integrated waveguides may be fabricated on a silicon layer in the chip. A lower cladding layer may be formed by thermal oxidation of the silicon layer. The core may be deposited by plasma enhanced chemical vapor deposition (PECVD). A waveguide pattern may be defined by optical contact lithography and transferred to the core layer by reactive ion etching (RIE). The etched waveguide pattern may be overgrown with PECVD silicon oxide as the upper cladding layer.

Figure 8:
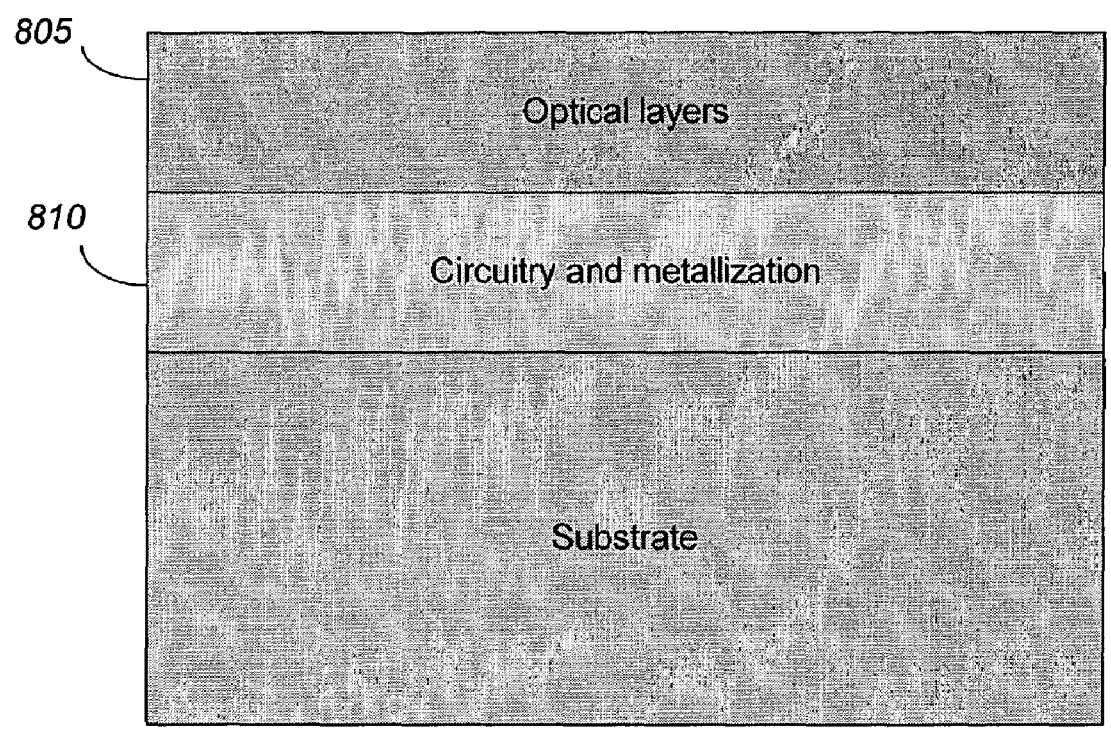
FIG. 8 is a sectional view of a chip including integrated electrical and optical devices in separate layers.

The optical components may be incorporated in optical layer(s) 805, which may be separate from the layers 810 containing the electronic circuitry components of the microprocessor, as shown in FIG. 8. The optical layer(s) may be produced during backend processing of the chip. In this case, a lower cladding layer for the integrated waveguides may be formed by growing a silicon oxide layer using chemical vapor deposition (CVD) or sputtering techniques.

A number of embodiments have been described. Nevertheless, it will be understood that various modifications may be made without departing from the spirit and scope of the invention. Accordingly, other embodiments are within the scope of the following claims.

The invention claimed is:

1. An apparatus comprising:
   a waveguide formed into a closed loop, the loop having an optical path length operative to multiply a frequency of pulses from a light source,
   wherein the optical path length is A*(1−1/x), where A is an optical path length a pulse travels before the next pulse enters the closed loop and x is a multiplication factor.

2. The apparatus of claim 1, further comprising:
   a delivery waveguide operative to couple light pulses from the light source to the closed loop.

3. The apparatus of claim 2, wherein the optical path length of the closed loop is such that in a steady state, light pulses in the closed loop are separated by a spacing of 1/x of an original spacing between light pulses in the delivery waveguide, where x is a multiplication factor.

4. The apparatus of claim 1, wherein the waveguide is integrated in a microchip.

5. The apparatus of claim 1, wherein the waveguide is operative to multiply a frequency of pulses in the gigahertz range.

6. The apparatus of claim 1, wherein the waveguide comprises a ring resonator.

7. The apparatus of claim 1, further comprising:
a plurality of distribution waveguides; and
a plurality of taps operative to couple at least a portion of light in the closed loop into the distribution waveguides.

8. The apparatus of claim 7, wherein the distribution waveguides comprise high index contrast waveguides.

9. The apparatus of claim 7, further comprising:
photodetectors coupled to the distributions waveguides and operative to convert the light pulses into electrical signals.

10. An apparatus comprising:
a waveguide formed into a closed loop, the loop having an optical path length operative to multiply a frequency of pulses from a light source,
wherein the optical path length is $A*(1+1/x)$, where A is an optical path length a pulse travels before the next pulse enters the closed loop and x is a multiplication factor.

11. The apparatus of claim 10, wherein the waveguide is integrated in a microchip.

12. The apparatus of claim 10, further comprising:
a plurality of distribution waveguides; and
a plurality of taps operative to couple at least a portion of light in the closed loop into the distribution waveguides, respectively.

13. The apparatus of claim 12, further comprising:
photodetectors respectively coupled to the distribution waveguides and operative to convert the light pulses into electrical signals.

14. A system comprising:
a light source;
a waveguide on a microchip, the waveguide being formed into a closed loop having an optical path length operative to multiply a frequency of pulses from the light source; and
a delivery waveguide to couple light pulses from the light source into the closed loop,
wherein the optical path length is $A*(1-1/x)$, where A is an optical path length a pulse travels before the next pulse enters the closed loop and x is a multiplication factor.

15. The system of claim 14, wherein the optical path length of the closed loop is such that in a steady state, light pulses in the closed loop are separated by a spacing of 1/x of an original spacing between light pulses in the delivery waveguide.

16. The system of claim 14, wherein the light source is operative to provide light pulses at a frequency in the gigahertz range.

17. The system of claim 14, wherein the waveguide comprises a ring resonator.

18. The system of claim 14, further comprising:
a plurality of distribution waveguides; and
a plurality of taps operative to couple at least a portion of light in the closed loop into the distribution waveguides.

19. The system of claim 18, wherein the distribution waveguides comprise high index contrast waveguides.

20. The system of claim 18, further comprising:
Photodetectors respectively coupled to the distribution waveguides and operative to convert the light pulses into electrical signals.

21. A system comprising:
a light source;
a waveguide on a microchip, the waveguide being formed into a closed loop having an optical path length operative to multiply a frequency of pulses from the light source; and
a delivery waveguide to couple light pulses from the light source into the closed loop,
wherein the optical path length is $A*(1+1/x)$, where A is an optical path length a pulse travels before the next pulse enters the closed loop and x is a multiplication factor.

22. The system of claim 21, further comprising:
a plurality of distribution waveguides; and
a plurality of taps operative to couple at least a portion of light in the closed loop into the distribution waveguides, respectively.

23. The system of claim 22, further comprising:
photodetectors respectively coupled to the distribution waveguides and operative to convert the light pulses into electrical signals.

* * * * *